June 15, 1954     T. E. BRYAN     2,681,014
GAS LIFT VALVE
Filed Dec. 22, 1948     3 Sheets-Sheet 1
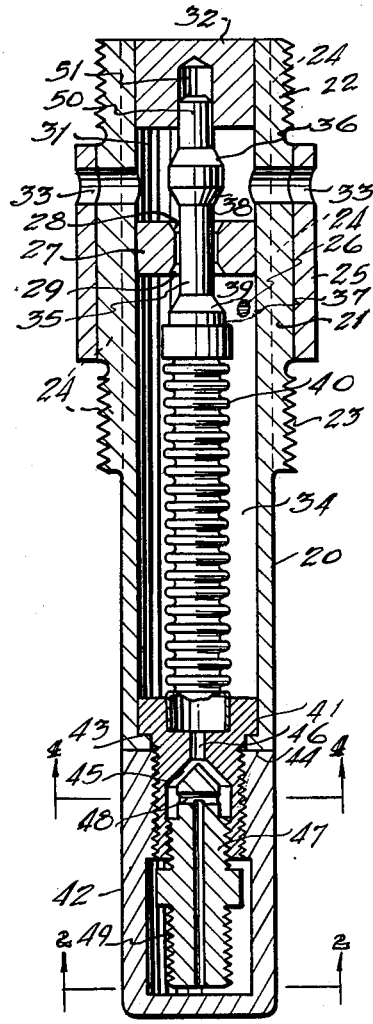
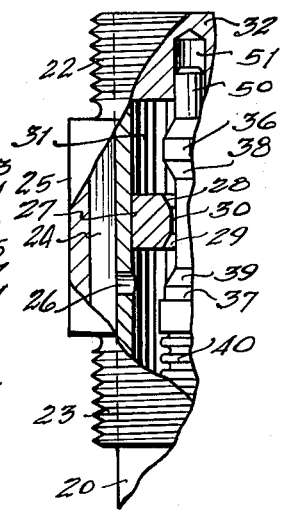
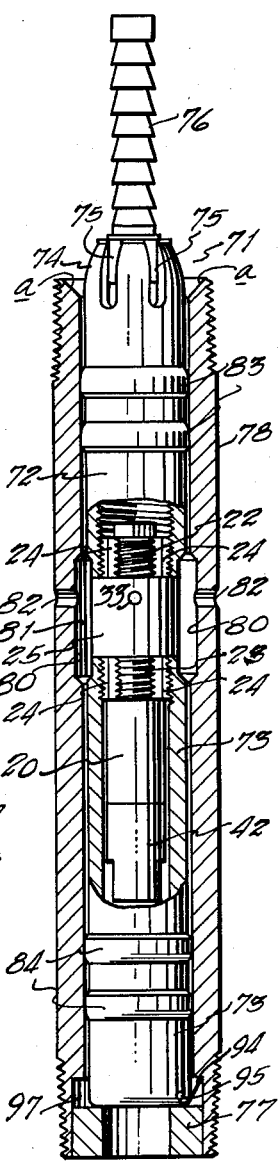
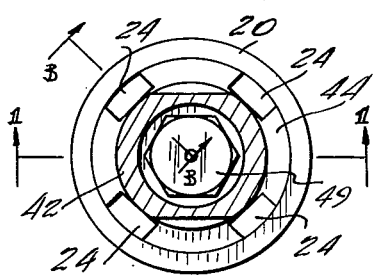
THOMAS E. BRYAN
INVENTOR.
BY
ATTORNEY

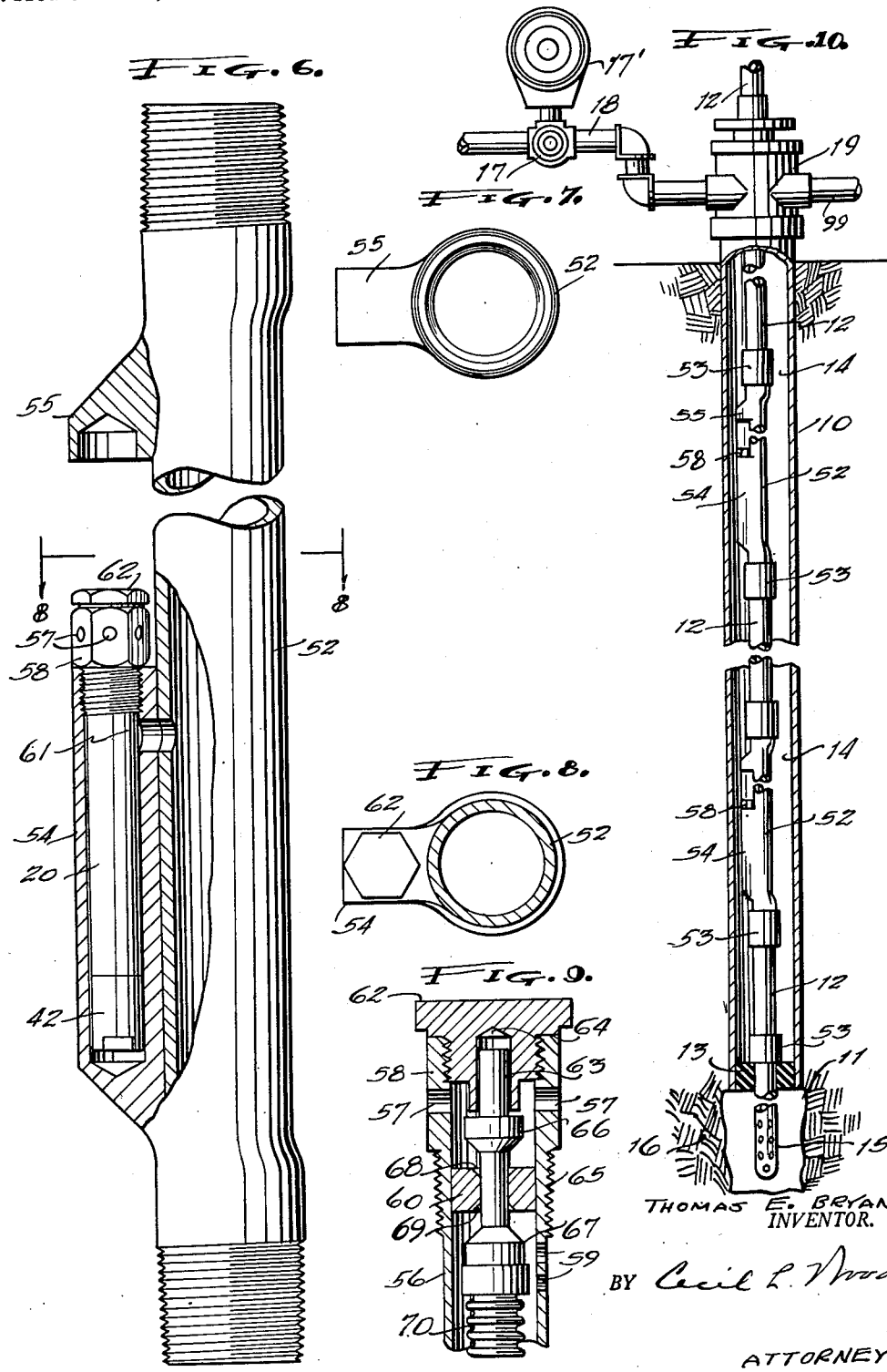

June 15, 1954  T. E. BRYAN  2,681,014
GAS LIFT VALVE
Filed Dec. 22, 1948  3 Sheets-Sheet 3
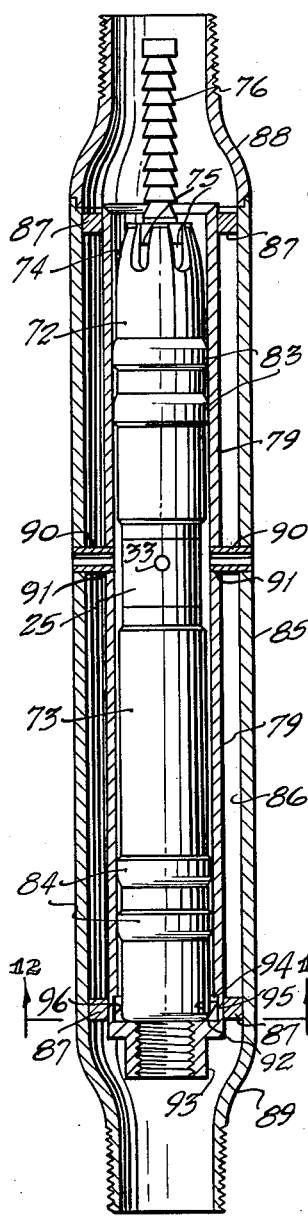
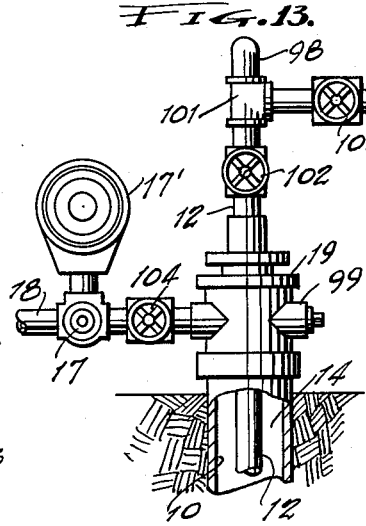
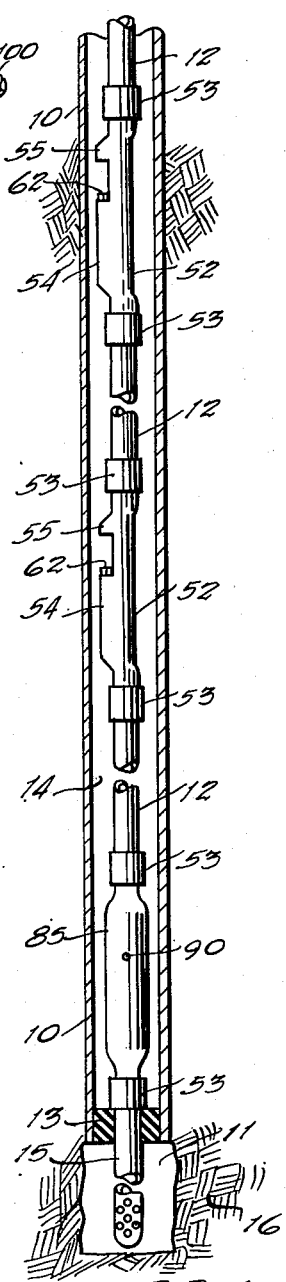
THOMAS E. BRYAN
INVENTOR.
BY
ATTORNEY Patented June 15, 1954

2,681,014

UNITED STATES PATENT OFFICE 2,681,014

GAS LIFT VALVE

Thomas E. Bryan, Fort Worth, Tex.

Application December 22, 1948, Serial No. 66,605

5 Claims. (Cl. 103—233)

This invention relates to apparatus for raising oil from oil wells, and the like, by injecting gas pressures into the well casing, and it has particular reference to a valve capable of being installed in one of a pair of conduits arranged in a well, co-axially or otherwise, at different levels to be acted upon by the gaseous pressures injected into the well from the earth's surface, and it has for its primary object the provision of a valve structure of simple and economical design and which embraces a tubular housing through which gaseous fluids are permitted to pass from one of the conduits to the other and in which it can be controlled through an arrangement of seats engageable by closure members forming parts of a stem operative longitudinally of the housing by the injected pressures, and having a pressure loaded expansible element normally urging one of said closure elements against one of the seats to be moved only by predetermined pressures applied to the said stem.

Another object of the invention resides in the provision of a system of automatic valves capable of arrangement at different levels in an oil well whereby suitable gas pressures can be applied at proper stages therein to effect the movement of a liquid column rising into one of the said conduits from the production area of said well but whose natural pressures are insufficient to raise the liquid column to the earth's surface to be discharged into storage.

A still further object of the invention resides in the provision of a system of conduits arranged in an oil well in which one of said conduits is provided with a plurality of spaced fittings, each formed with means for removably supporting an automatic valve actuated intermittently by gas pressures.

An object of the invention is that of providing a system of valves which may be desirably spaced in an oil well, in combination with a co-axial arrangement of conduits and a packer, in such a manner as to provide for the equalization of pressures between the said conduits, one of which conduits provides for the movement of well fluids from the production area in said well to the earth's surface, while the other of said conduits functions to conduct a lifting fluid from the earth's surface to raise the fluid column in the well by natural or artificial pressures introduced into the liquid column as the same is naturally flowed from the production sands of the well.

A prime object of the invention is that of providing a means for producing oil from an oil well in an economical manner, and preventing the application of excess pressures to the oil sands which force the oil back into the production formations instead of allowing the same to naturally flow into the well to be conducted to the earth's surface, while avoiding the necessity for the use of pumps, and other apparatus, for raising the well fluids.

An important object of the invention is that of providing a valve which is responsive to applied pressures only to lift fluids from an oil well and which is adapted to utilize the increased energy in gas at higher pressures when expanded to a lower pressure in the tubing, and to employ the applied pressure in increasing inclements as greater depths are reached in operation.

Yet another object of the invention is to provide a system or method of unloading fluids from the casing by forcing the same through a communication between the casing and tubing spaced well below the spaced valves, wherein the well fluid can be displaced from the casing to the tubing without cutting out, damaging, or stopping up the valves with debris.

It is an important object of the invention to provide a system of valves, one or more of which may be employed, which will function to open at injected pressures of a definite or predetermined value, applied to the casing at fixed intervals as required to move the liquid column accumulated in the tubing from the formation, and adjusted to close when such injected pressures are increased or decreased. The valve mechanism is so designed that the valve will remain closed to liquid pressures within the flow tube at all times but capable of opening by and to injected casing pressures of predetermined values, and to close when such pressures are decreased below such values. Thus, when a series of valves are employed, each can be adjusted to operate at different injected pressure values according to their location.

Broadly, the invention contemplates the provision of apparatus which embodies improvements upon devices hereinbefore shown and described in Letters Patent No. 2,145,918, issued to Thomas E. Bryan.

While the foregoing objects are paramount, other and lesser objects will become manifest as the description proceeds, taken in connection with the appended drawings wherein:

Figure 1 is a vertical cross-sectional view of one form of the valve employed in the invention, showing the internal parts thereof, and the pressure retaining expansible element for operating the same.

Figure 2 is a transverse cross-sectional illustration of the valve assembly, taken on lines 2—2 of Figure 1, and illustrating the valve for sealing the pressure retaining element.

Figure 3 fragmentarily illustrates the upper portion of the valve assembly shown in Figure 1, and is a partial cross-sectional view taken on lines 3—3 of Figure 2, illustrating one of the ports opening into the valve housing.

Figure 4 is a transverse cross-sectional view taken on lines 4—4 of Figure 1.

Figure 5 illustrates the valve assembly arranged within a removable valve housing adapted to be installed in a string of tubing from the earth's surface, and showing a fitting, in vertical section, adapted to be coupled into the said tubing to receive the assembly.

Figure 6 is an elevational view of another type of fitting, adapted to be installed in the tubing string, portions of which are cut away showing the type of valve assembly illustrated in vertical section in Figure 9.

Figure 7 is a plan view of the fitting illustrated in Figure 6.

Figure 8 is a transverse cross-sectional view, taken on lines 8—8 of Figure 6, showing the top of the valve assembly supported in the fitting.

Figure 9 is a fragmentary vertical cross-sectional illustration of the valve assembly shown installed in the fitting in Figure 6, showing the arrangement of the stem, ports, and the retaining cap in the top of the valve housing.

Figure 10 is a schematic illustration showing a series of the valves installed in an oil well, the casing and packer being illustrated in vertical section, and showing an intermitting device connected at the earth's surface.

Figure 11 illustrates a modified form of the fitting shown in Figure 5 and which is employed in the sytem illustrated in Figure 10, in which a removable type of valve, such as shown in Figure 5, is installed.

Figure 12 is a transverse sectional view taken on lines 12—12 of Figure 11.

Figure 13 illustrates the head assembly for the casing and tubing showing a time controlled intermitter and valves for conduits, and Figure 14 is a schematic view of a casing and tube assembly in the lower end of which the fitting shown in Figure 11 is installed.

The invention, while depending upon certain prescribed unitary structures embodied in valve assemblies described herein, actually comprises a system of valves arranged at different levels in an oil well. The essential conventional parts of the equipment include a well casing 10 arranged in the bore 11, as shown in Figures 10 and 14, having a fluid conduit or tubing string 12 concentrically installed therein.

A packer 13 is arranged at or near the lower end of the casing 10 and provides a seal about the tubing 12 defining an annular space 14 therearound inside of the casing 10 above the packer 13. A perforated tail pipe 15 is connected to the lower end of the tubing 12 and extends into the production area 16 of the well to conduct the well fluid into the tubing 12 and thence to the earth's surface, aided by artificial gaseous pressures introduced into the space 14 in the casing 10 and controlled by a conventional pressure regulator 17 installed in a pressure line 18 connected into the casing head 19, in the manner shown in Figures 10 and 13. As will presently become apparent, it is desirable to employ a time-cycle unit calculated to intermittently admit gas pressures into the casing 10 to insure a proper flow of oil from the production area 16 and only as it is flowed thereinto by formation pressures.

In Figure 1 is shown the one form of valve structure embodied in the invention, and consists of a tubular housing 20 having a head 21 formed near its upper end. Exteriorly threaded portions 22 and 23 are defined on the housing 20 above and below the head 21 whose functions will be presently made manifest. The head 21, as well as the threaded portions 22 and 23, is formed with a plurality of longitudinal flutes or grooves 24 spaced circumferentially therearound, as shown in Figures 2, 3 and 4, and these extend through the threaded portions 22 and 23 and their central portions are covered by a sleeve 25 so that both ends of the grooves 24 are open. Certain of said grooves 24 have communications through ports 26 with the interior of the housing 20, as in Figure 3.

A ported disk 27 is arranged in the housing 20, approximately intermediate the ends of the head 21, as shown in Figure 1, and is formed with oppositely arranged seats 28 and 29 in the central port 30. The disk 27 defines a chamber 31 in the upper end of the housing 20 which is closed by a plug 32. A plurality of ports 33 are arranged through the walls of the head 21 and the sleeve 25 providing communication with the chamber 31 from the outside of the housing 20, the ports 26 affording communications from the grooves 24 with the lower chamber 34 below the disk 27.

A valve stem 35 is arranged through the port 30 in the disk 27 and closures 36 and 37 are formed on the stem 35 above and below the disk 27 having bevelled seating surfaces 38 and 39 conformable with the bevelled seats 28 and 29. The closures 36 and 37 are adapted to close the port 30 from either side.

The lower end of the stem 35 is connected to the upper end of a longitudinally contractible and expansible pressure retaining diaphragm 40 whose lowermost end is attached to a loading valve 41 seated in the lower end of the housing 20 and secured by a cap 42 threaded upon its lower end, the circular flange 43 of the valve 41 bearing upon the inner flange 44 of the housing 20, as illustrated in Figure 1. The valve 41 has a central cavity 45 in its lower portion and an orifice 46 providing communication between the cavity 45 and the interior of the diaphragm 40. The member 40 is constructed to be capable of retaining relatively high pressures and its function will become apparent.

A closure 47 is threaded into the cavity 45 and has a fluid passage longitudinally therethrough connecting with a transverse passage 48 by which air or gas is introduced under pressure to the diaphragm 40 from a suitable source by attaching a suitable coupling (not shown) to the opposite threaded end 49 of the closure 47, the upper end of which is conical and conforms to the conical seat in the cavity 45 to close the orifice 46 and retain the pressure in the diaphragm 40 which normally retains the closure element 37 against its seat 29. The cap 42 embraces the closure 47 and is attached when the diaphragm 40 has been loaded. The upper end 50 of the stem 35 extends into a recess 51 in the plug 32 and serves to properly center the stem 35 is operation. The valve structure illustrated in Figures 1 and 3, and described above, is designed for installation in a removable housing which is capable of being seated in one of the special fittings shown in Figures 5 or 11 and these elements will be presently described in detail.

In Figure 6 is illustrated a fitting 52 which is capable of being connected into the tubing string 12 by suitable couplings 53, in the manner shown in Figures 10 and 14. The member 52 is threaded on each end and is formed with an integral receptacle 54, as in Figure 6. Spaced above the receptacle 54 is an integral hood 55 affording further protection for a valve assembly arranged therein. More adaptable to the installation shown in Figure 6 is the valve illustrated in Figure 9 which is similar in nearly all of its details to the valve illustrated in Figure 1. It will become apparent, however, that the housing 56 in the structure shown in Figure 9 does not have the sleeve 25 although a plurality of ports 57 are formed in the polygonal head 58, as illustrated in Figure 6. A pair of ports 59 are formed in the housing 56 below the head 58 and the seat member 60 and these ports communicate with a port 61 in the wall of the fitting 52 providing communication between the valve housing 56 and the receptacle 54 when the assembly is installed in the manner shown in Figure 6. The upper end of the housing 56 is closed by a flanged plug 62 threaded into the member 56, and the upper end of the valve stem 63 operates within a recess 64 in the plug 62.

The housing 56 has a threaded portion 65 just below the head 58 by which the assembly is threaded into the upper end of the receptacle 54 so that the major portion of the housing 56 extends downwardly into the receptacle 54 and is thus protected against damage from vibration and other factors. On the stem 63 are a pair of closures 66 and 67 adapted to alternately engage the seats 68 and 69 in the member 60. A diaphragm 70 is secured to the lower end of the stem 63 and this element is identical with the member 40 of the structure shown in Figure 1.

Referring again to the valve illustrated in Figures 1 and 3, it will become apparent that this assembly is housed within a removable casing 71 which has upper and lower sections 72 and 73 threaded, respectively, upon the threaded portions 22 and 23 of the housing 20. The upper section 72 has a rounded shoulder 74 at its upper end about which is arranged a plurality of ports 75. A spear 76 is attached to the upper end by which the assembly can be handled by a cable (not shown). The lower section 73 is substantially flat on the bottom and is adapted to engage a supporting ring 77 in the bottom of a fitting 78, shown in Figure 5, or a fitting 79, shown in Figure 11. The structure just described, and illustrated in Figures 5 and 11, will hereafter be referred to as a drop valve.

The fitting 78 is tubular and is exteriorly threaded at each end whereby it can be connected into the tubing 12 by collars 53. The upper end of the fitting 78 is bevelled inwardly at a to expedite the seating of the drop valve assembly thereinto. Just above its mid-section a relatively wide groove 80 is formed interiorly of the fitting 78 by which is formed an annular space 81 about the head 21 of the housing 20 of the valve assembly. Through the walls of the fitting are ports 82 which correspond to the ports 33 in the head 21. Above and below the space 81 and ports 82 are sealing rings or cups 83 and 84 arranged upon the upper and lower sections 72 and 73 of the valve assembly.

In Figure 11 is illustrated the fitting 79 which is also cylindrical and has an outer shell 85 of suitable diameter to define an annular space 86 about the fitting 79 which is concentrically supported therein by spacer members 87 extending radially between the fitting 79 and the shell 85, as shown in Figure 12. Both ends 88 and 89 of the shell 85 are swaged and threaded for connection into the tubing 12 by the collars 53 and the upper end 88 is detachable to provide for the installation of the fitting 79 therein. A nipple 90 is arranged in each of the ports 91 in the fitting 79 providing communication exteriorly thereof through the walls of the shell 85, as shown in Figure 11. The ports 91 register with the ports 33 of the head 21 of the valve assembly.

The drop valve is seated in the fitting 79 upon an annular shoulder 92 formed in the bottom thereof, below which is an interiorly threaded boss 93 into which may be threaded a pipe (not shown) which extends into the tail pipe 15. A latch 94 is pivotally attached to the bottom of the drop valve by a pin 95 which is capable of being sheared when the drop valve assembly is removed by a cable. The fitting 85 is installed in the tubing in the manner illustrated in Figure 14 near the packer 13 after first determining the static level of the fluid in the well by conventional methods. The latch 95 drops into the annular space 96 defined about the bottom of the fitting 79 just above the shoulder 92 upon which the drop valve is seated. An annular space 97 is defined, in the structure illustrated in Figure 5, above the seating ring 77 in which the latch 95 is dropped to lock the assembly against displacement by pressures from below.

The drop valve is installed from the earth's surface through the tubing 12 after removing the plug 98 at the upper end thereof which is shown in Figure 13. A cable (not shown) is employed having a suitable grapple thereon for engaging the spear 76. It will be observed that the valve can be passed down the tubing 12 through the fittings 52 and finally seated in the fitting 78 or 79 at the bottom of the string in the manner shown in Figures 10 and 14.

The casing and tubing head 19 may have a plurality of connecting conduits such as the gas or air inlet 18, in which the pressure regulator and intermitter 17 and 17' are arranged. The conduit 18 is connected into the casing 10 and conducts pressures into the annular space 14 about the tubing 12. An oil outlet conduit 99 connects into the tubing 12 while the latter extends upwardly through the head 19 and is capped by the plug 98. In the arrangement shown in Figure 13 the outlet 99 is plugged and the oil is discharged through a lateral 100 in a T-coupling 101 in the tubing 12 above the head 19. Gate valves 102, 103 and 104 are installed in the conduits 18 and 100, and in the tubing 12 above the head 19.

The invention, therefore, contemplates the provision of a valve assembly which can be utilized in producing the well fluid under ordinary prevailing bottom hole pressures, and provides for the conservation thereof. A series of the valves are arranged at spaced intervals along the tubing string in the fittings 52 while the drop valve assembly is arranged at the lower level in one of the fittings 78 or 79, as exemplified in Figures 10 and 14, respectively. The drop valve is preferably placed just above the packer 13 for the best results.

It is a prime object of the invention to lift the oil, as nearly as possible, in accordance with known physical laws, imposing the greatest force at a point where it would be the most effective. Therefore, it is desirable to "load" each of the diaphragms, or flexible pressure devices, 40 and 70 accordingly. The uppermost diaphragm 40, for example, should contain approximately 300 pounds while each successive diaphragm contains 50 pounds greater pressure, the lowermost valve having the heaviest charge.

Thus when the drop valve is removed, pressure is applied to the casing area 14 by by-passing the time cycle unit while regulating the input pressure to the casing until the pressures in the latter reach a value a fraction less than that of the diaphragm in the uppermost valve whereupon the time cycle unit can be placed in operation to open the pressure line to the regulator 17' which opens at controlled rates and admits gas under pressure to the casing area 14 to equal the pressure of the uppermost valve. The time cycle device is regulated so that all of the fluid in the tubing 12 above the uppermost valve is raised or flowed to the surface. This will be indicated by a constant passage of gas through the uppermost valve with practically no liquid.

At this point the time cycle device is adjusted to admit gases at greater or stepped-up rates to raise the pressures in the casing area 14 another 50 pounds to close the uppermost valve and open the second valve. This action is due, in part, to the arrangements of transfer ports through the fittings 78 or 79 so that, as the pressure is increased in the casing area 14, the fluid therein is forced downwardly, through the fitting and rises in the tubing 12. Such action lowers the fluid column in the casing and the second valve is uncovered and opened, when the differential in pressures is reached, admitting gases therethrough.

This action occurs successively with each valve downwardly to provide for the establishment of intermittent flow of well fluids at any desired level by setting the time cycle unit so that it functions only at intervals sufficient to raise well fluids thus accumulated in the tubing. The casing pressure will, at this point, be permitted to drop back to the original opening pressure of the valve establishing the production level. This operation is repeated until the lowermost valve is reached, or the drop valve, if it is employed, when the time cycle unit and regulator can be set to produce the well as desired and as the well fluid enters the tubing and reaches a suitable level therein.

The well is first unloaded by introducing gas pressure into the casing area 14 to displace well fluids therefrom into the tubing 12. This can be done by removing the drop valve and raising the pressures above the capacities of the respective bellows or diaphragms 40. The fitting 79 at the bottom of the tubing 12 can then be plugged or the drop valve employed. The pressure can be regulated to maintain a constant flow of well fluids through the tubing 12. Thereafter the area 14 about the tubing 12 is maintained dry or void of fluids, the latter being capable of flowing upwardly from the formations 16 below the packer 13 through the tail pipe 15 and around the fitting 79 in the shell 85, or through the ports provided in the fittings 78 and 79 and the valves therein, the latter being acted upon by gas pressures.

Obviously, when the gas pressures in the casing and tubing are equalized no fluid can reenter the casing through any of the valves for the reason that they remain closed, opening only when the casing pressure is greater, and under such conditions the passage of liquids therethrough is restricted.

Certain changes and modifications in the structure herein shown and described may be resorted to from time to time by persons skilled in the art without departing from the spirit and intent of the invention or the scope of the appended claims.

What is claimed is:

1. A well flowing combination including a flow string, a series of valves carried thereby and controlling communication with the interior of the string at various levels, and means for applying gas under pressure to said valves to cause the gas to enter the flow string, each of said valves having an element movable to open and close communication with the interior of the string, a bellows having one part connected to said element and another part anchored with respect to said string, and an elastic pressure fluid within the bellows under a pressure greater than atmospheric to normally tend to cause said bellows to expand and move said element to closed position, the pressure in the various bellows varying progressively from a relatively low pressure in the uppermost to a relatively high pressure in the lowermost bellows, and the bellows all having their exteriors subjected to the pressure of the gas to be admitted to the string, whereby as the pressure of said gas is increased said valves will open in turn from the uppermost to the lowermost.

2. A series of valves of the class described, for use in admitting gas under pressure to a flow string and spaced along said flow string, supported thereby and controlling a communication between the exterior and interior of said flow string, each valve including a member expansible to close the valve and contractible to open the same and subjected to the pressure of the gas to be admitted to the string, and an elastic pressure fluid within each of said members tending to expand the same, the pressures of said fluid in the various expansible members varying progressively from a relatively low pressure within the member on the valve occupying the uppermost position with respect to the flow string to a relatively high pressure within the member on the valve occupying the lowermost position in said string and means supporting said lowermost valve internally of said flow string, said valve capable of being withdrawn from said means through said string.

3. A well flowing combination including a flow string, a series of valves carried thereby and controlling communication with the interior of the string at various levels, and means for applying gas under pressure to said valves to cause the gas to enter the flow string, each of said valves having an element movable to open and close communication with the interior of the string, a bellows having one part connected to said element and another part anchored with respect to said string, and an elastic pressure fluid within the bellows under a pressure greater than atmospheric to normally tend to cause said bellows to expand and move said element to closed position, the pressure in the various bellows varying progressively from a relatively low pressure in the uppermost to a relatively high pressure in the lowermost bellows, and the bellows all having their exteriors subjected to the pressure of the gas to be admitted to the string, whereby as the pressure of said gas is increased said valves will first open, and thereafter close in turn from the uppermost to the lowermost as the pressure of said gas is increased.

4. A well flowing combination including a flow string, a series of valves carried thereby and controlling communication with the interior of the string at various levels, and means for applying gas under pressure to said valves to cause the gas to enter the flow string, each of said valves having an element movable to open and close communication with the interior of the string, a bellows having one part connected to said element and another part anchored with respect to said string, and an elastic pressure fluid acting on the bellows under a pressure greater than atmospheric to normally tend to cause said bellows to expand and move said element to closed position, the pressure acting on various bellows varying progressively from a relatively low pressure in the uppermost to a relatively high pressure in the lowermost bellows, and the bellows all having their exteriors subjected to the pressure of the gas to be admitted to the string, whereby as the pressure of said gas is increased said valves will open in turn from the uppermost to the lowermost.

5. A well flowing combination including a flow string, a series of valves carried thereby and controlling communication with the interior of the string at various levels, and means for applying gas under pressure to said valves to cause the gas to enter the flow string, each of said valves having an element movable to open and close communication with the interior of the string, a bellows having one part connected to said element and another part anchored with respect to said string, and an elastic pressure fluid acting on the bellows under a pressure greater than atmospheric to normally tend to cause said bellows to move said element to closed position, the pressure acting on various bellows varying progressively from a relatively low pressure in the uppermost to a relatively high pressure in the lowermost bellows, and the bellows being subjected to the pressure of the gas to be admitted to the string, whereby as the pressure of said gas is increased said valves will open in turn from the uppermost to the lowermost.

References Cited in the file of this patent

UNITED STATES PATENTS

| Number | Name | Date |
| --- | --- | --- |
| 1,169,250 | Fulton | Jan. 25, 1916 |
| 1,927,958 | Simmons | Sept. 26, 1933 |
| 2,145,918 | Bryan | Feb. 7, 1939 |
| 2,230,107 | Garrett | Jan. 28, 1941 |
| 2,236,864 | Worthington | Apr. 1, 1941 |
| 2,248,950 | Boynton | July 15, 1941 |
| 2,305,250 | Garrett et al. | Dec. 15, 1942 |
| 2,314,869 | Boynton | Mar. 20, 1943 |
| 2,339,487 | King | Jan. 18, 1944 |
| 2,465,060 | Carlisle | Mar. 22, 1949 |
| 2,642,812 | Robinson | June 23, 1953 |